March 11, 1930.     B. H. TINGLEY     1,749,788
WEIGHING COUNTER
Filed June 27, 1927
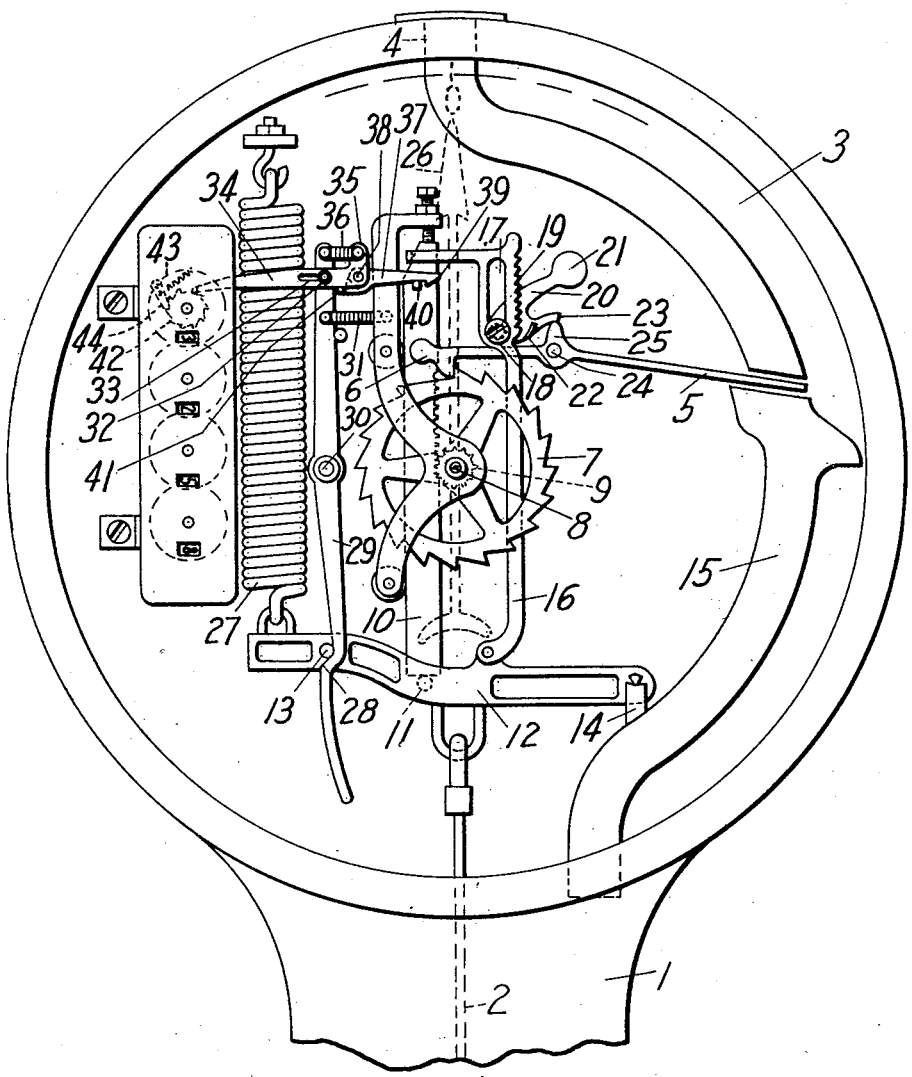
INVENTOR.
B. H. TINGLEY.
H. W. Baker
ATTORNEY.

Patented Mar. 11, 1930

1,749,788

UNITED STATES PATENT OFFICE

BRUCE H. TINGLEY, OF DAYTON, OHIO, ASSIGNOR TO OHMER FARE REGISTER COMPANY, OF DAYTON, OHIO

WEIGHING COUNTER

Application filed June 27, 1927. Serial No. 201,579.

My invention relates to an improved weighing counter, and more specifically, it refers to a counter which will be positively actuated by a weighing scale when a coin is deposited and a weight is placed on the scale platform. It will not count when a person stands on the weighing platform and does not deposit a coin, nor will it count when a coin is deposited and no weight is placed on the platform.

The figure in the drawing is an elevational view of the top portion of a modern weighing mechanism having my improved structure incorporated therein.

Ordinarily, such weighing scales consist of a stand 1, on the lower portion of which is mounted a platform in operative connection with a rod 2 which extends upwardly through the stand 1. On top of the stand is mounted a head 3, in the upper portion of which is a coin chute 4 which extends downwardly to the outer end of a trigger 5. As the coin strikes the trigger 5, the trigger is depressed raising the weighted end 6 thereof out of engagement with a toothed wheel 7 mounted on a shaft 8 which carries a pinion 9 meshing with the rack rod 10 which is supported by a pin 11 carried by a beam 12 pivoted on a lug 14 and connected with the rod 2. After tripping the trigger 5, the coin passes downwardly through a channel 15 into a coin receptacle, not shown. The beam 12 has secured thereto a rod 16, which at its upper end is provided with a slot 17 which receives a stationary pin 18 carried by the head 3, and is provided with up-turned teeth 19. An arm 20 is pivoted on the pin 18 and carries a weight 21, a pawl 22 and a toe 23. When the coin trips the trigger 5, pivoted on a pin 24, a lug 25 carried by the trigger is rotated clockwise so that the weight 21 causes the arm 20 to be lowered and the toe 23 holds the trigger 5 in depressed position by engaging the lug 25. If a person stands on the platform without depositing the money, the beam 12 would be operated and would lower the rod 16, but would not affect the rack rod 10, nor would the shaft 8 be rotated. A pointer 26 is secured to the shaft 8 and it would, therefore, follow that the pointer would not be rotated to indicate the weight of the person unless he had deposited his money. If he should now drop in his coin, it would trip the trigger 5 so that the toothed wheel 7 would be free to rotate, and the rack rod 10 would descend by gravity until it came into contact with the pin 11, thereby rotating the shaft 8 and the pointer 26 to indicate the weigh of the person. The pawl 22 is not in engagement with the teeth 19. If the person weighing should partially step off the platform so that another person could step on to be weighed for the same money, the beam 12 would partially ascend so that the teeth 19 would, through the pawl 22, raise the weight 21, thereby removing the toe 23 from the lug 25, and the trigger would resume the position shown in the drawings. It would now be in engagement with the toothed wheel 7 which would prevent the second person weighing. When the person steps off the scale the beam 12 is returned to a normal position by means of the spring 27 so that the pointer 26 points to zero.

A pin 13 is carried by the beam 12 and engages a cam portion 28 of a lever 29 pivoted on a pin 30. The lever 29 is held against the pin 13 by means of a spring 31. The upper end of the lever 29 is provided with a pin 32 which extends through a slot 33 in a counter actuating arm 34, which at its inner end is up-turned, forming a lug 35 which is connected to the upper end of the lever 29 by means of a spring 36. An arm 37 is pivoted to the arm 34 by means of a pin 38, and at its inner end it is provided with a toe 39 adapted to engage a lug 40 carried by the rack rod 10. At its outer end it is provided with a toe 41 which underlies the arm 34 and prevents the arm 37 from dropping when the rack rod 10 descends. The outer end of the counter actuating arm 34 engages a ratchet 42 on a units counter wheel 43 which is operatively connected with the tens, hundreds and thousands counter wheels in any conventional manner. A spring pressed holding pawl 44 is also provided to prevent retrograde movement of the units counter wheel.

If a person stands on the platform without depositing the required coin, the beam 12 will descend and the pin 13 will move the lever 29 in a counter-clockwise direction, but as the rack rod 10 will be held against movement, the lug 40 will not disengage the toe 39 and will hold so that the counter actuating arm 34 will be held against movement, the pin 32 simply sliding in the slot 33 against the tension of the spring 36. If the person should now deposit the coin while standing on the platform, the rack 10, as before mentioned, would descend, thereby removing the lug 40 from the toe 39 and the spring 36 would move the counter actuating arm 34 to the left, actuating the ratchet 42 a sufficient distance to rotate the counter one numeral.

If a person should deposit the coin and fail to mount the platform the counter would not operate, for the beam 12 would not move. If he should first deposit the coin and should then step on the platform, he would be properly weighed and the counter would be actuated.

The counter should agree with the number of coins which had been deposited for no one would have any object in depositing a coin without weighing, and each time a person weighs that fact is recorded on the counter wheels.

While I have shown the counter wheels as visual wheels, it is obvious that the numerals could be placed on the periphery from which a printed impression may be taken by any conventional means.

I fully realize that many changes might be made in the specific structure which I have shown by way of illustration only. I, therefore, desire to claim my invention broadly in whatever form it may be embodied.

1. In a weighing machine, a counter, an arm whereby said counter may be actuated, a lever to actuate said arm, a pin and slot connection between said arm and lever, means to actuate said lever each time a weight is placed on said machine, and means to prevent the actuation of said arm by said lever until a coin has been deposited, said pin sliding in said slot when said lever is actuated without a coin being deposited.

2. In a weighing machine, an indicator, means whereby said indicator is held stationary until a coin is deposited in said machine, a counter, means whereby said counter is actuated simultaneously with said indicator, said last mentioned means including a lug, an arm, a second arm pivoted to said first mentioned arm, a toe carried by said second arm, and engaging said lug when the parts are in normal position, and means whereby said lug is removed from said toe when a weight is placed on the machine and a coin deposited therein.

3. In a weighing machine, an indicator, means whereby said indicator is held stationary until a coin is deposited in said machine, a counter, means whereby said counter is actuated simultaneously with said indicator, said last mentioned means including a lug, an arm, a second arm pivoted to said first mentioned arm, a toe carried by said second arm, and engaging said lug when the parts are in normal position, means whereby said lug is removed from said toe when a weight is placed on the machine and a coin deposited therein, and means to hold said second mentioned arm in substantial alignment with said first mentioned arm when said lug has been removed.

4. In combination, an indicator, means whereby said indicator is held stationary until a coin is deposited, a counter, means whereby said counter and indicator are actuated simultaneously, an arm forming a part of the actuating means for said counter, a lever, a pin and slot connection operatively connecting said arm and lever, means whereby said lever is actuated, a lug carried by said arm, a spring connecting said lug and the end of said lever adjacent said pin and slot connection, means whereby said arm may be held stationary so that said pin will travel in said slot against the tension of said spring, and means whereby said lever and arm may be caused to travel together so as to actuate said counter.

In testimony whereof I affix my signature.

BRUCE H. TINGLEY.